United States Patent
Guo et al.

(10) Patent No.: US 9,118,546 B2
(45) Date of Patent: Aug. 25, 2015

(54) DATA FORWARDING METHOD AND ROUTER

(71) Applicant: Huawei Technologies Co., Ltd., Shenzhen, Guangdong (CN)

(72) Inventors: Yinghui Guo, Beijing (CN); Xiaowu Li, Beijing (CN); Shaowei Liu, Beijing (CN); Yang Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 110 days.

(21) Appl. No.: 13/895,818

(22) Filed: May 16, 2013

(65) Prior Publication Data

US 2013/0250752 A1    Sep. 26, 2013

Related U.S. Application Data

(63) Continuation of application No. PCT/CN2011/070247, filed on Jan. 14, 2011.

(51) Int. Cl.
*H04L 12/26* (2006.01)
*H04L 12/24* (2006.01)
*H04L 12/703* (2013.01)
*H04L 12/773* (2013.01)
*H04L 12/939* (2013.01)

(52) U.S. Cl.
CPC ............ *H04L 41/0668* (2013.01); *H04L 45/28* (2013.01); *H04L 45/60* (2013.01); *H04L 49/557* (2013.01)

(58) Field of Classification Search
None
See application file for complete search history.

(56) References Cited

U.S. PATENT DOCUMENTS

| | | | |
|---|---|---|---|
| 6,332,198 B1 | 12/2001 | Simons et al. | |
| 6,885,635 B1* | 4/2005 | Haq et al. | 370/219 |
| 6,894,969 B1 | 5/2005 | Chidambaran et al. | |
| 6,941,487 B1* | 9/2005 | Balakrishnan et al. | 714/4.5 |
| 7,139,928 B1* | 11/2006 | Bhattacharya et al. | 714/4.4 |
| 7,298,752 B2* | 11/2007 | Moriwaki et al. | 370/401 |
| 7,525,904 B1* | 4/2009 | Li et al. | 370/217 |
| 7,593,320 B1* | 9/2009 | Cohen et al. | 370/217 |

(Continued)

FOREIGN PATENT DOCUMENTS

| | | |
|---|---|---|
| CN | 1866909 A | 11/2006 |
| CN | 101060487 A | 10/2007 |

(Continued)

OTHER PUBLICATIONS

1st Office Action in corresponding Chinese Patent Application No. 201180000303.8 (Mar. 4, 2013).

(Continued)

*Primary Examiner* — Michael J Moore, Jr.
(74) *Attorney, Agent, or Firm* — Leydig, Voit & Mayer, Ltd.

(57) ABSTRACT

A data forwarding method and a router are provided. The router includes: forwarding engines FEs, physical interface cards PICs, a first switch device and a second switch device, where the first switch device includes a primary first switch device and a standby first switch device, all the FEs are connected with each other via the first switch device, the FEs are connected to the PICs via the second switch device, the number of the FEs is at least two, the number of the PICs is at least two, and the number of the FEs is equal to the number of the PICs. Embodiments of the present invention could improve reliability of a system.

6 Claims, 5 Drawing Sheets

(56) References Cited

U.S. PATENT DOCUMENTS

| | | | |
|---|---|---|---|
| 7,804,769 B1 * | 9/2010 | Tuplur et al. | 370/218 |
| 8,050,559 B2 * | 11/2011 | Sindhu | 398/49 |
| 2003/0137980 A1 | 7/2003 | Jung | |
| 2009/0252492 A1 | 10/2009 | Sone et al. | |

FOREIGN PATENT DOCUMENTS

| | | |
|---|---|---|
| CN | 101296389 A | 10/2008 |
| EP | 1330079 A1 | 7/2003 |
| EP | 1552656 B1 | 12/2006 |
| WO | WO 2008148330 A1 | 12/2008 |

OTHER PUBLICATIONS

International Search Report in corresponding PCT Patent Application No. PCT/CN2011/070247 (Oct. 20, 2011).

Extended European Search Report in corresponding European Patent Application No. 11782857.4 (Jun. 14, 2013).

Written Opinion of the International Searching Authority in corresponding PCT Patent Application No. PCT/CN2011/070247 (Oct. 20, 2011).

"Data Sheet Cisco PXM45/C Processor Switch Module," Cisco Systems, San Jose, California (Jan. 1, 2007).

* cited by examiner

DATA FORWARDING METHOD AND ROUTER

CROSS-REFERENCE TO RELATED APPLICATIONS

This application is a continuation of International Patent Application No. PCT/CN2011/070247, filed on Jan. 14, 2011, which is hereby incorporated by reference in its entirety.

FIELD OF THE INVENTION

The present invention relates to the field of mobile communications technologies, and in particular, to a data forwarding method and a router.

BACKGROUND OF THE INVENTION

A router is a main node apparatus of the Internet, and a main function of the router is determining, by way of routing, forwarding of data. With the development of the computer hardware technologies, development directions of the architecture of the router are large capacity as well as distribution. At present, processing performance or a capacity of the router is still an important goal pursued by the development of a service bandwidth. At the same time, to satisfy a demand of a large bandwidth, stability and reliability are also indispensable indexes.

Referring to FIG. 1, FIG. 1 is a schematic diagram of a data forwarding structure of a router in the prior art. As shown in FIG. 1, forwarding engines (FEs, Forwarding Engines) are bound to physical interface cards (PICs, Physical Interface Cards) one-to-one, each FE may not only perform uplink data sending, but also perform downlink data sending, and interconnections between the FEs are achieved via a switching network. In the forwarding structure shown in FIG. 1, uplink data may be inputted via any PIC of a system, sent by an FE bound to the PIC in uplink direction, and then sent to any FE in the system via the switching network, and finally a PIC bound to the FE outputs the inputted data. Therefore, the forwarding structure makes full use of forwarding resources and expands a forwarding capacity. Meanwhile, a 1:1 backup is performed on the switching network, thereby achieving reliability of the switching network.

However, during the research, the inventors find that, in the forwarding structure in the prior art, only a 1:1 backup is performed on a switching network and no backup is performed on an FE and a PIC, and the function of data forwarding cannot be implemented normally once the FE or the PIC fails, resulting in low reliability of the whole system.

SUMMARY OF THE INVENTION

Embodiments of the present invention provide a data forwarding method and a router so as to improve reliability of a system.

An embodiment of the present invention discloses a router, which includes: forwarding engines FEs, physical interface cards PICs, a first switch device and a second switch device, where the first switch device includes a primary first switch device and a standby first switch device, all the FEs are connected with each other via the first switch device, the FEs are connected to the PICs via the second switch device, the number of the FEs is at least two, the number of the PICs is at least two, and the number of the FEs is equal to the number of the PICs.

An embodiment of the present invention further discloses a router, which includes: forwarding engines FEs, physical interface cards PICs, a first switch device and a second switch device, where the first switch device includes a primary first switch device and a standby first switch device, all the FEs are connected with each other via the first switch device, the FEs are connected to the PICs via the second switch device, the number of the FEs is at least two, the number of the PICs is at least two, the number of the FEs is equal to the number of the PICs, two PICs connected with each other via the second switch device are connected to two nodes in an optical network ring network respectively, and the second switch device is configured to perform data distribution in uplink direction according to a running status of the FEs when IP data switching is performed, and send, when optical switching processing is performed, the data to a PIC serving as a downstream node during current optical switching.

The present invention further discloses a method for implementing IP data forwarding in a router, which includes: receiving, by a physical interface card PIC, data; and sending, by the PIC, the data to a normally running FE connected to the PIC via a second switch device.

The present invention further discloses a method for implementing optical network data forwarding in a router, which includes: receiving, by a physical interface card PIC, data, and sending the data to a second switch device connected to the PIC; and sending, by the second switch device, the data to a PIC serving as a downstream node during current optical switching.

It may be seen from the foregoing embodiments that, in the router, all the FEs are connected with each other via the first switch device, and the first switch device includes the primary first switch device and the standby first switch device, so that a 1:1 redundant backup of the first switch device may be achieved. Meanwhile, at least two FEs are connected to an equal number of at least two PICs via the second switch device. Therefore, redundant backups of a FE and a PIC may be achieved. Thereby, reliability of the whole system is improved finally.

In addition, in the router, two PICs that are connected with each other via the second switch device may be used to construct an optical ring network so that the router may also perform forwarding process on optical network data at the same time, thereby improving utilization efficiency of the router.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

In order to make the objectives, features and advantages of the present invention clearer, embodiments of the present invention are described in detail below with reference to the accompanying drawings.

Embodiment 1

Figure 1:
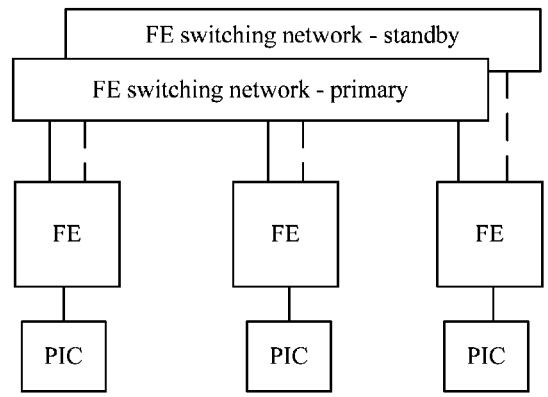
FIG. 1 is a schematic diagram of a data forwarding structure of a router in the prior art.
Figure 2:
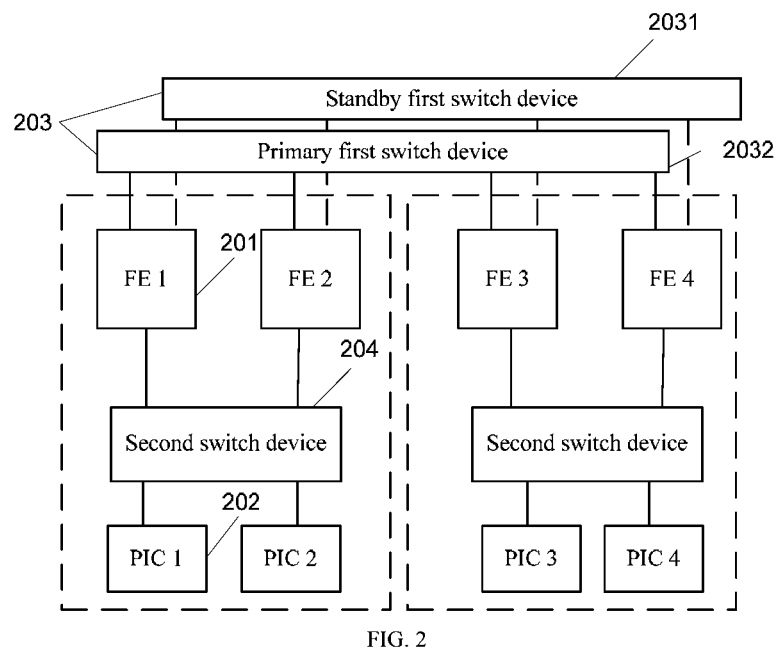
FIG. 2 is a schematic structural diagram of a principle in an embodiment of a router according to the present invention.

Referring to FIG. 2, FIG. 2 is a schematic structural diagram of a principle in an embodiment of a router according to the present invention. In FIG. 2 of this embodiment, to illustrate a structure of the router easily and conveniently, a router including four FEs and four PICs is taken as an example for illustration. As shown in FIG. 2, the router includes: FEs 201, PICs 202, a first switch device 203 and second switch devices 204, where the first switch device 203 includes a primary first switch device 2031 and a standby first switch device 2032, all the FEs 201 are connected with each other via the first switch device 203, the FEs 201 are connected to the PICs 202 via the second switch devices 204, the number of the FEs 201 is at least two, the number of the PICs is at least two, and the number of the FEs 201 is equal to the number of the PICs 202.

As shown in FIG. 2, in the four FEs and the four PICs, an FE 1 and an FE 2 are connected to a PIC 1 and a PIC 2 via a second switch device, and an FE 3 and an FE 4 are connected to a PIC 3 and a PIC 4 via a second switch device. In the connection relationship in FIG. 2, the FE 1 and the FE 2 are backups to each other, the PIC 1 and the PIC 2 are backups to each other, the FE 3 and the FE 4 are backups to each other, and the PIC 3 and the PIC 4 are backups to each other. Therefore, in FIG. 2, via a connection of the second switch devices, a 1:1 backup is achieved between each two FEs, and a 1:1 backup is achieved between each two PICs.

Of course, it is also possible that the four FEs and the four PICs are connected with each other via a second switch device. In this way, the FE 1, the FE 2, the FE 3 and the FE 4 are backups to each other, and the PIC 1, the PIC 2, the PIC 3 and the PIC 4 are backups to each other. Therefore, via a connection of the second switch device, a 1:4 backup is achieved between each four FEs, and a 1:4 backup is achieved between each four PICs.

Preferably, the first switch device 203 is a switch fabric card (Switch Fabric Card, SFC). Of course, in addition to the SFC, other device may also be adopted, and the embodiments of the present invention do not specifically limit the first switch device that connects all the FEs 201.

The second switch device 204 may be a backplane, while distribution of data is executed by a PIC, or may be a traffic distribution apparatus responsible for a distribution of data.

Preferably, when the second switch device 204 is a backplane, a PIC 202 is configured to, according to a running status of a FE 201, distribute received data to a normally running FE 201 connected to the PIC 202.

Figure 3:
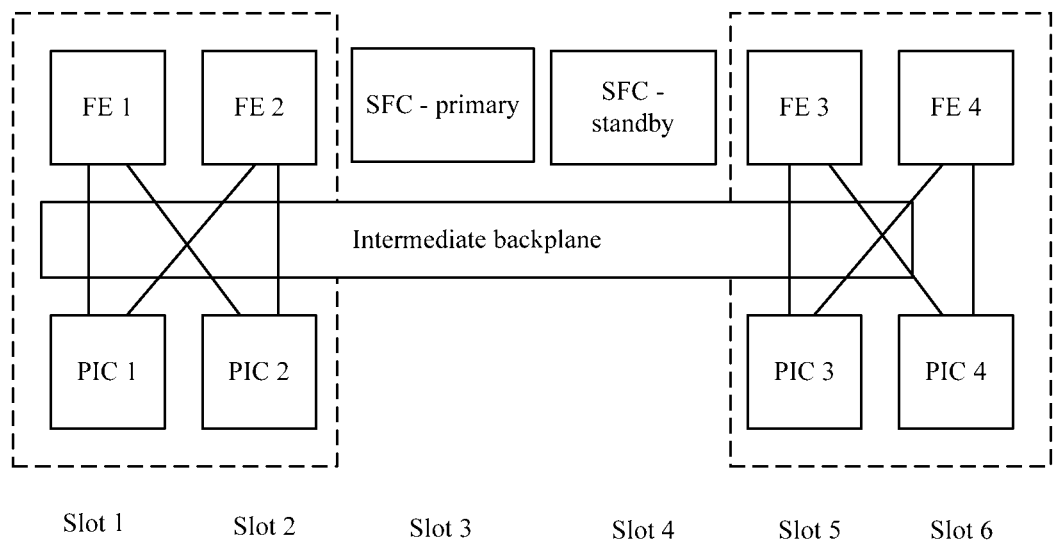
FIG. 3 is a schematic structural diagram of a product of a router according to the present invention.

Referring to FIG. 3, FIG. 3 is a schematic structural diagram of a product of a router according to the present invention. As shown in FIG. 3, a second switch device is an intermediate backplane, where the central backplane connects the FE 1 and the FE 2 to the PIC 1 and the PIC 2, and connects the FE 3 and the FE 4 to the PIC 3 and the PIC 4.

Figure 4:
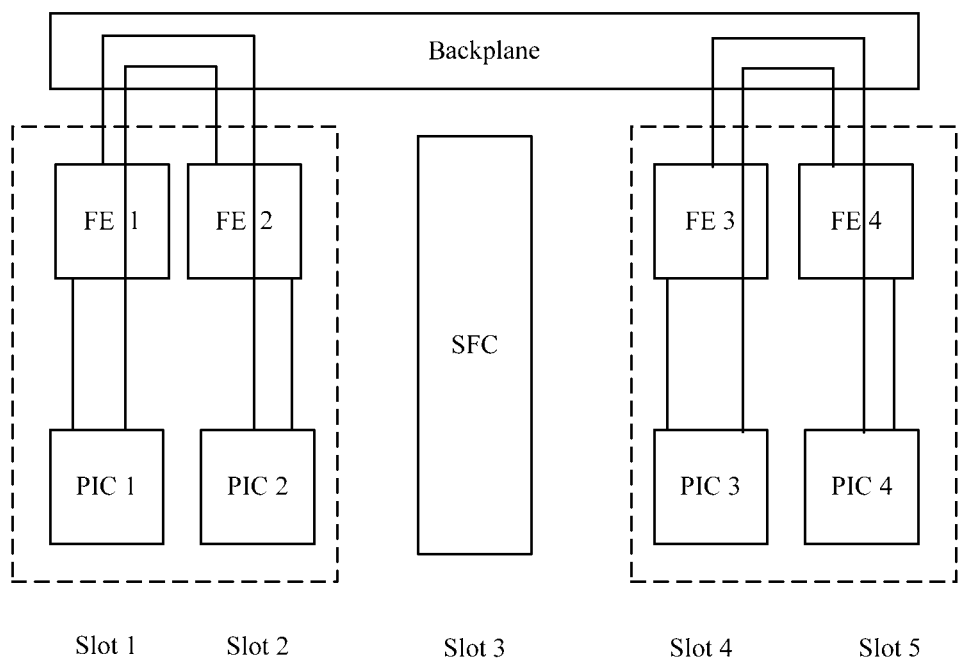
FIG. 4 is a schematic structural diagram of another product of a router according to the present invention.

Meanwhile, in view of a connection relationship, besides the intermediate backplane, the second switch device may also be a backplane. Referring to FIG. 4, FIG. 4 is a schematic structural diagram of another product of a router according to the present invention. As shown in FIG. 4, a second switch device is a backplane, the PIC 1 is connected to the FE 1 that is located in a slot where the PIC 1 is located, the PIC 2 is connected to the FE 2 that is located in a slot where the PIC 2 is located, and at the same time, the FE 1 is connected to the FE 2 via the backplane; the PIC 3 is connected to the FE 3 that is located in a slot where the PIC 3 is located, the PIC 4 is connected to the FE 4 that is located in a slot where the PIC 4 is located, and at the same time, the FE 3 is connected to the FE 4 via the backplane. Therefore, connections of the FE 1 and the FE 2 with the PIC 1 and the PIC 2 and connections of the FE 3 and the FE 4 with the PIC 3 and the PIC 4 are also achieved.

Preferably, when the second switch device 204 is a traffic distribution apparatus, the traffic distribution apparatus is configured to, according to a running status of FEs, distribute data received by the PICs to a normally running FE connected to the PICs.

Figure 5:
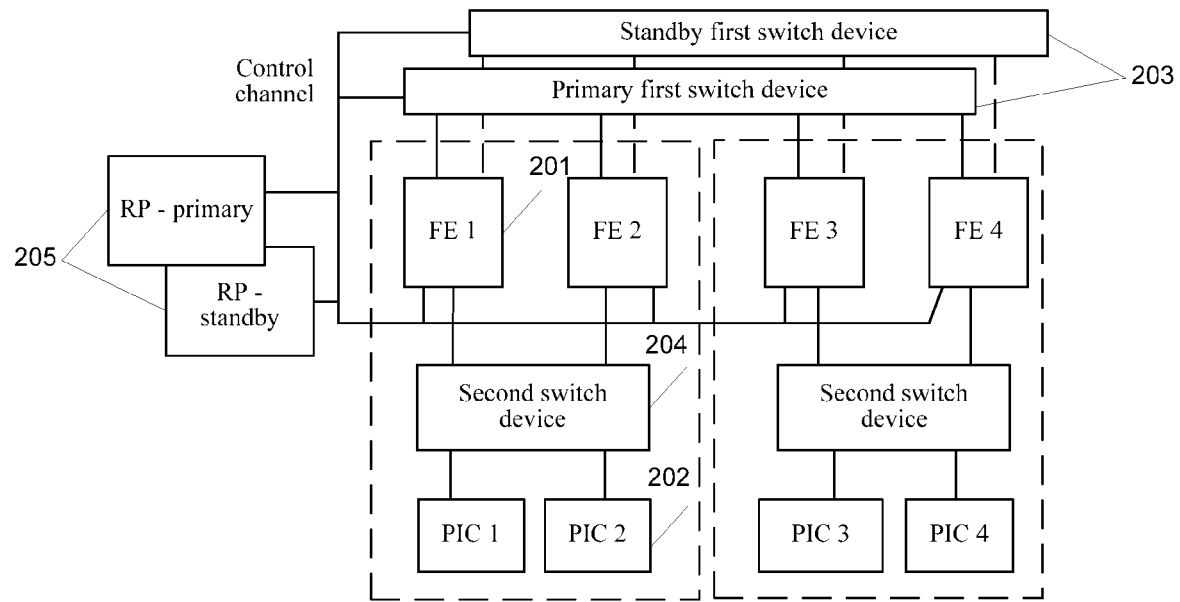
FIG. 5 is another schematic structural diagram of a principle in an embodiment of a router according to the present invention.

The running status of a FE may be obtained by implementing self-detection carried out by the FE, may be obtained by detecting the FE by a route processor (Route Processor, RP) on a main control board of the router, and may also be obtained by detecting the FE by a CPU on a line card (Line Card, LC) where each FE is located. Referring to FIG. 5, FIG. 5 is another schematic structural diagram of a principle in an embodiment of a router according to the present invention. As shown in FIG. 5, an RP 205 on the main control board of the router is connected to the first switch device 203 via a control channel, and the RP 205 is configured to notify outside of a detection result via the control channel after abnormal running of the FE is detected. For example, if the PIC performs data distribution, the RP 205 notifies the PIC of the detection result; if a data distribution apparatus performs a data distribution, the RP 205 on the main control board of the router notifies the data distribution apparatus of the detection result. In addition, to ensure reliability of the RP 205, a 1:1 backup may be achieved by utilizing a primary RP 205 and a standby RP 205.

Figure 6:
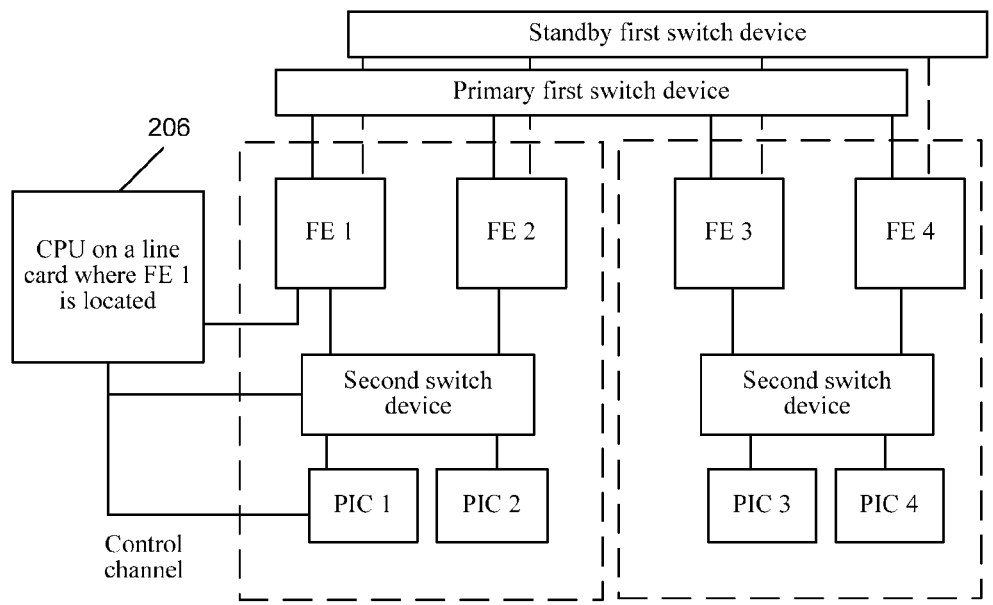
FIG. 6 is another schematic structural diagram of a principle in an embodiment of a router according to the present invention.

Referring to FIG. 6, FIG. 6 is another schematic structural diagram of a principle in an embodiment of a router according to the present invention. A CPU 206 on a line card where a FE is located is connected to a first switch device via a control channel, and the CPU 206 is configured to notify outside of a detection result via the control channel after abnormal running of the FE is detected. For example, if a PIC performs data distribution, the CPU 206 notifies the PIC of a detection result; if a data distribution apparatus performs the data distribution, the CPU 206 on the main control board of the router notifies the data distribution apparatus of the detection result.

In addition, as shown in FIG. 2, each FE may carry out self-detection, and notify the data distribution apparatus or the PIC of the detection result after detecting abnormal running.

It should be noted that, in a same router, the RP 205 on the main control board of the router, the CPU 206 on the line card where a FE is located, and the FE 201 may continuously detect different failure scenarios at the same time. An abnormal condition detected by the FE is a local component failure sensed by the FE, for example, a failure of an interface between the FE and the first switch devices or a failure of an internal processor of the FE. An abnormal condition detected by the RP 205 on the main control board of the router usually is board detachment. An abnormal condition detected by the CPU 206 on the line card where the FE is located usually is a local component failure or a failure on logic of a processor sensed by the CPU.

It may be seen from the foregoing embodiment that, in the router, all the FEs are connected with each other via the first switch device, and the first switch device includes the primary first switch device and the standby first switch device, so that a 1:1 redundant backup of the first switch device may be achieved. Meanwhile, at least two FEs are connected to at least two PICs via the second switch device, where the number of the at least two FEs is equal to the number of the at least two PICs. Therefore, redundant backups of a FE and a PIC may be achieved. Thereby, reliability of the whole system is improved finally.

Embodiment 2

Figure 7:
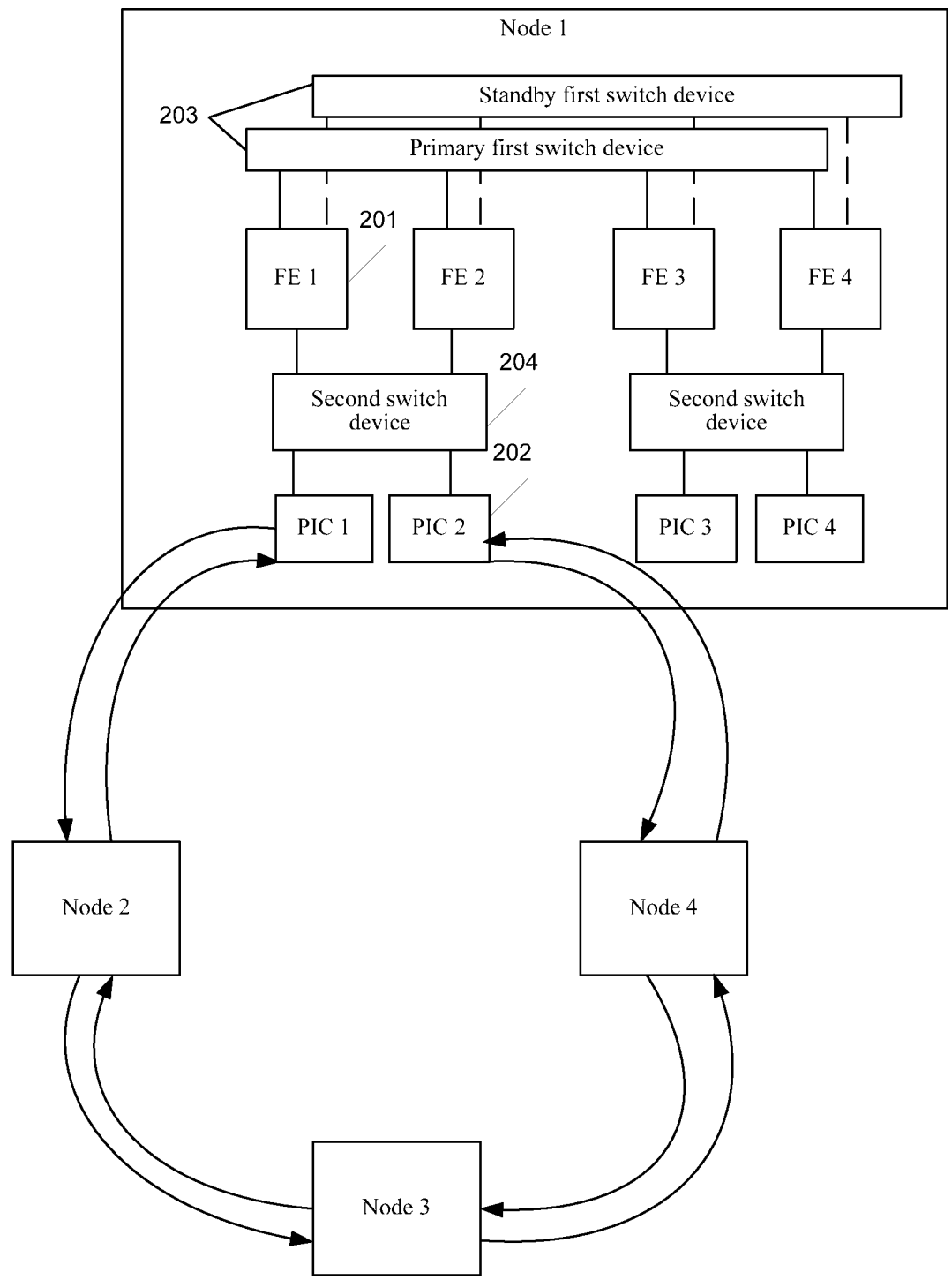
FIG. 7 is a schematic structural diagram of a principle in another embodiment of a router according to the present invention.

Referring to FIG. 7, FIG. 7 is a schematic structural diagram of a principle of another embodiment of a router according to the present invention. In this embodiment, two PICs connected with each other via a second switch device are connected to two nodes in an optical network ring network, so that the router may not only forward IP data, but also forward optical network data. In FIG. 7 of this embodiment, to illustrate a structure of the router easily and conveniently, a router including four FEs and four PICs is taken as an example for illustration. As shown in FIG. 7, the router includes: FEs 201, PICs 202, a first switch device 203 and second switch devices 204, where the first switch device 203 includes a primary first switch device 2031 and a standby first switch device 2032, all the FEs 201 are connected with each other via the first switch device 203, the FEs 201 and the PICs 202 are connected with each other via the second switch device 204, the number of the FEs is at least two, the number of the PICs is at least two, the number of the FEs is equal to the number of the PICs, the two PICs 202 connected with each other via the second switch device are connected to two nodes in an optical network respectively, and the second switch device 204 is configured to perform data distribution in uplink direction according to a running status of the FEs when IP data switching is performed, and send, when optical switching processing is performed, data to a PIC serving as a downstream node during current optical switching.

As the structure of the router for IP data forwarding has been described in detail in Embodiment 1, the details will not be described again in this embodiment, and reference may be made to Embodiment 1 for the related structure.

In the router shown in FIG. 7, the PIC 1 and the PIC 2 connected with each other via the second switch device are connected to two nodes, a Node 2 and a Node 4, in the optical network respectively. In an optical ring network, the PIC 1 and the Node 2 are an upstream node and a downstream node respectively within the PIC 1 and the Node 2, the PIC 1 and the PIC 2 are an upstream node and a downstream node respectively within the PIC 1 and the PIC 2, and the PIC 2 and the Node 4 are an upstream node and a downstream node respectively within the PIC 2 and the Node 4. When the optical switching processing is performed, the second switch device is configured to send the data to the PIC serving as a downstream node during current optical switching. For example, in a case of a clockwise optical ring network, the PIC 1 is a downstream node of the Node 2, the PIC 2 is a downstream node of the PIC 1, the Node 4 is a downstream node of the PIC 2, the Node 3 is a downstream node of the Node 4, and the Node 2 is a downstream node of the Node 3, forming a sequential cycle. When the PIC 1 receives optical network data, the second switch device sends the optical network data to the PIC 2 serving as the downstream node of the PIC 1.

Likewise, an optical ring network may also be constructed between the PIC 3 and the PIC 4. In addition, if the four FEs and the four PICS are connected with each other via the second switch device so that a 1:4 backup is achieved between each four FEs and a 1:4 backup is achieved between each four PICS, as the four PICS are connected with each other via the second switch device, any two PICS may be selected from the four PICS to construct an optical ring network.

It may be seen from the foregoing embodiment that, in the router, all the FEs are connected with each other via the first switch device, and the first switch device includes the primary first switch device and the standby first switch device, so that a 1:1 redundant backup of the first switch device may be achieved. Meanwhile, at least two FEs and an equal number of at least two PICS are connected with each via the second switch device. Therefore, redundant backups of a FE and a PIC may be achieved. Thereby, reliability of the whole system is improved finally.

In addition, in the router, two PICS that are connected with each other via the second switch device may also be used to construct an optical ring network so that the router may also perform forwarding process on optical network data at the same time, thereby improving utilization efficiency of the router.

Embodiment 3

Figure 8:
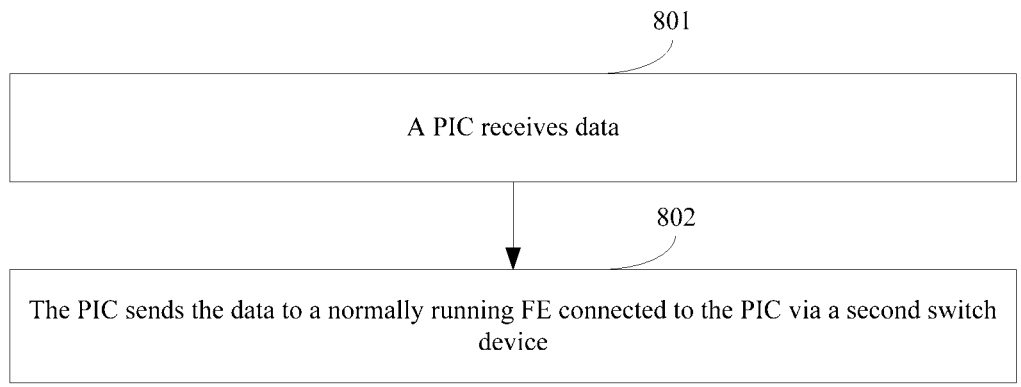
FIG. 8 is a flow chart of an embodiment of a method for implementing IP data forwarding in a router according to Embodiment 1 or Embodiment 2 of the present invention.

Corresponding to the router in Embodiment 1 or Embodiment 2 described in the foregoing, an embodiment of the present invention further provides a method for implementing IP data forwarding in the router according to Embodiment 1 or Embodiment 2. Referring to FIG. 8, FIG. 8 is a flow chart of an embodiment of a method for implementing IP data forwarding in a router according to Embodiment 1 or Embodiment 2 of the present invention, where the method includes the following steps:

Step 801: A PIC receives data.

Step 802: The PIC sends the data to a normally running FE connected to the PIC via a second switch device.

The sending, by the PIC, the data to the normally running FE connected to the PIC via the second switch device includes: sending, by the PIC, the data to the second switch device; obtaining, by the second switch device, a running status of an FE that is located in a slot where the PIC is located; and sending, by the second switch device when the running is abnormal, the data to any other normally running FE connected to the PIC.

For example, as shown in FIG. 2, if the PIC 1 sends the data to the second switch device, the second switch device obtains a running status of the FE 1 that is located in a slot where the PIC 1 is located. When the FE 1 runs normally, the second switch device sends the data to the FE 1. When the FE 1 runs abnormally, the second switch device obtains a running status of the FE 2 connected to the PIC 1 via the second switch device, and if the FE 2 runs normally, the second switch device sends the data to the FE 2. Particularly, if all the FEs connected to the PIC 1 via the second switch device run abnormally, the second switch device directly discards the data.

Alternatively, the sending, by the PIC, the data to the normally running FE connected to the PIC via the second switch device includes: obtaining, by the PIC, a running status of an FE that is located in a slot where the PIC is located; and when the running is normal, sending, by the PIC via the second switch device, the data to the FE that is located in the slot where the PIC is located, otherwise, sending, via the second switch device, the data to any other normally running FE connected to the PIC.

For example, as shown in FIG. 2, after the PIC 1 receives the data, the PIC 1 obtains a running status of the FE 1 that is located in a slot where the PIC 1 is located. When the FE 1 runs normally, the PIC 1 sends the data to the FE 1. When the FE 1 runs abnormally, the PIC 1 obtains a running status of the FE 2 connected to the PIC 1 via the second switch device, and if the FE 2 runs normally, the PIC 1 sends the data to the FE 2 via the second switch device. Particularly, if all the FEs connected to the PIC 1 via the second switch device run abnormally, the PIC 1 directly discards the data.

Preferably, a method for obtaining the running status of the FE includes any one or any combination of the following three manners:

implementing, by the FE that is located in a slot where the PIC is located, self-detection, and notifying outside of a detection result when an abnormality is detected;

detecting, by an RP on a main control board of the router, the FE, and notifying outside of a detection result when an abnormality is detected; and detecting, by a CPU on a line card where the FE is located, the FE, and notifying outside of a detection result when an abnormality is detected.

It may be seen from the foregoing embodiment that, in the router, all the FEs are connected with each other via the first switch device, and the first switch device includes the primary first switch device and the standby first switch device, so that a 1:1 redundant backup of the first switch device may be achieved. Meanwhile, at least two FEs and an equal number of at least two PICs are connected with each via the second switch device. Therefore, redundant backups of a FE and a PIC may be achieved. Thereby, reliability of the whole system is improved finally.

Embodiment 4

Figure 9:
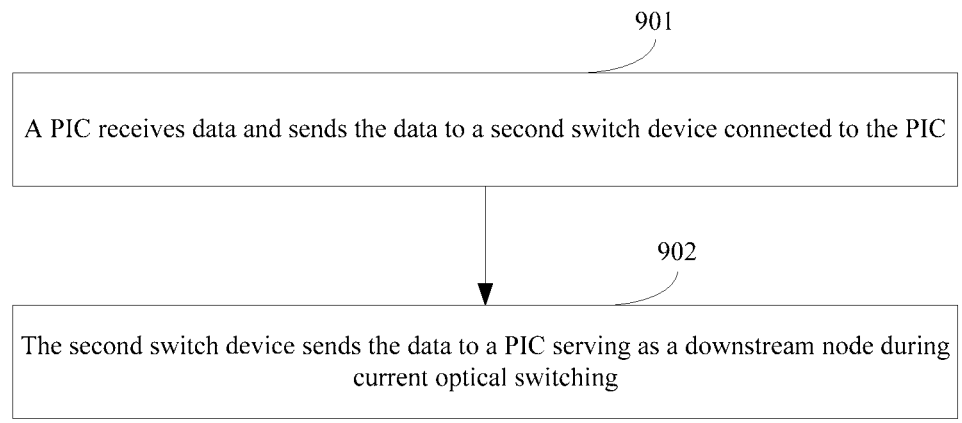
FIG. 9 is a flow chart of an embodiment of a method for implementing optical network data forwarding in a router according to Embodiment 2 of the present invention.

Corresponding to the router in Embodiment 2, an embodiment of the present invention further provides a method for implementing optical network data forwarding in the router according to Embodiment 2. Referring to FIG. 9, FIG. 9 is a flow chart of an embodiment of a method for implementing optical network data forwarding in a router according to Embodiment 2 of the present invention, where the method specifically includes the following steps:

Step 901: A PIC receives data and sends the data to a second switch device connected to the PIC.

Step 902: The second switch device sends the data to a PIC serving as a downstream node during current optical switching.

For example, as shown in FIG. 7, after the PIC 1 receives the data, the PIC 1 sends the data to the second switch device connected to the PIC 1, and the second switch device sends the data to the PIC 2 serving as a downstream node of the PIC 1.

It may be seen from the foregoing embodiment that, in the router for implementing IP data forwarding, the two PICs connected with each other via the second switch device may be used to construct an optical ring network so that the router may also perform forwarding process on optical network data at the same time, thereby improving utilization efficiency of the router.

It should be noted that, persons of ordinary skill in the art should understand that, all or a part of processes in the methods according to the embodiments may be accomplished by a computer program instructing relevant hardware. The program may be stored in a computer-readable storage medium. When the program is executed, the process of the method according to each of the embodiments may be performed. The storage medium may be a magnetic disk, an optical disk, a read-only memory (Read-Only Memory, ROM), a random access memory (Read-Only Memory, RAM), or the like.

The data forwarding method and the router provided by the present invention are described in detail in the foregoing. The principle and implementation of the present invention are described herein through specific embodiments. The description about the embodiments is merely provided for ease of understanding of the method and core ideas of the present invention. Persons of ordinary skill in the art can make modifications to the present invention in terms of the specific implementations and application scopes according to the ideas of the present invention. Therefore, the specification shall not be construed as a limitation to the present invention.

What is claimed is:

1. A router, comprising: at least two forwarding engines (FEs), at least two physical interface cards (PICs), a first switch device and a second switch device, wherein the first switch device is a switch fabric card, the first switch device comprises a primary first switch device and a standby first switch device, all the FEs are connected with each other via the first switch device, the FEs are connected to the PICs via the second switch device, a quantity of the FEs is equal to a quantity of the PICs, the PICs comprises a first PIC and a second PIC, the first PIC and the second PIC are connected with each other via the second switch device, the first PIC is connected to a first nodes in an optical network ring network, the second PIC is connected to a second node in the optical network ring network; the first node, the first PIC the second PIC and the second node are nodes within the optical network ring network, the first PIC is a downstream node of the first node within the optical network ring network, the second PIC is a downstream node of the first PIC within the optical network ring network, the second node is a downstream node of the second PIC within the optical network ring network, the second switch device is configured to perform data distribution in an uplink direction according to a running status of the FEs when IP data switching is performed, and the second switch device is further configured to send optical network data received by the first PIC to the second PIC when optical switching processing is performed.

2. A method for implementing IP data forwarding in a router, comprising:

receiving, by a physical interface card (PIC), data; and
sending, by the PIC, the data to a normally running forwarding engine (FE) connected to the PIC via a second switch device;

wherein the router comprises:

at least two FEs, at least two PICs, a first switch device and the second switch device, wherein the first switch device is a switch fabric card, the first switch device comprises a primary first switch device and a standby first switch device, all the FEs are connected with each other via the first switch device, the FEs are connected to the PICs via the second switch device, a quantity of the FEs is equal to a quantity of the PICs, the PICs comprises a first PIC and a second PIC, the first PIC and the second PIC are connected with each other via the second switch device, the first PIC is connected to a first node in an optical network ring network, the second PIC is connected to a second node in the optical network ring network; the first node, the first PIC, the second PIC and the second node are nodes within the optical network ring network, the first PIC is a downstream node of the first node within the optical network ring network, the second PIC is a downstream node of the first PIC within the optical network ring network, the second node is a downstream node of the second PIC within the optical network ring network, the second switch device is configured to perform data distribution in an uplink direction according to a running status of the FEs when IP data switching is performed, and the second switch device is further configured to send optical network data received by the first PIC to the second PIC when optical switching processing is performed.

3. The method according to claim 2, wherein the sending, by the PIC, the data to the normally running FE connected to the PIC via the second switch device comprises:
  sending, by the PIC, the data to the second switch device;
  obtaining, by the second switch device, a running status of an FE that is located in a slot where the PIC is located; and
  when the running status is normal, sending, by the second switch device, the data to the FE located in the slot where the PIC is located; when the running status is abnormal, sending the data to any other normally running FE connected to the PIC via the second switch device.

4. The method according to claim 2, wherein the sending, by the PIC, the data to the normally running FE connected to the PIC via the second switch device comprises:
  obtaining, by the PIC, a running status of an FE that is located in a slot where the PIC is located; and
  when the running status is normal, sending, by the PIC via the second switch device, the data to the FE that is located in the slot where the PIC is located; when the running status is abnormal, sending, via the second switch device, the data to any other normally running FE connected to the PIC.

5. The method according to claim 3, wherein obtaining the running status of the FE comprises at least one step of the group consisting of:
  implementing, by the FE that is located in the slot where the PIC is located, self-detection, and notifying outside of a detection result when an abnormality is detected;
  detecting, by a Route Processor (RP) on a main control board of the router, the FE, and notifying outside of the detection result when the abnormality is detected; and
  detecting, by a central processing unit (CPU) on a line card (LC) where the FE is located, the FE, and notifying outside of the detection result when the abnormality is detected.

6. A method for implementing optical network data forwarding by a router, comprising:
  receiving, by a physical interface card (PIC), data, and sending the data to a second switch device connected to the PIC; and
  sending, by the second switch device, the data to a PIC serving as a downstream node during current optical switching;
  wherein the router comprise: at least two forwarding engines (FEs), at least two PICs, a first switch device and the second switch device,
  wherein the first switch device is a switch fabric card, the first switch device comprises a primary first switch device and a standby first switch device, all the FEs are connected with each other via the first switch device, the FEs are connected to the PICs via the second switch device, a quantity of the FEs is equal to a quantity of the PICs, the PICs comprises a first PIC and a second PIC, the first PIC and the second PIC are connected with each other via the second switch device, the first PIC is connected to a first node in an optical network ring network, the second PIC is connected to a second node in the optical network ring network; the first node, the first PIC, the second PIC and the second node are nodes within the optical network ring network, the first PIC is a downstream node of the first node within the optical network ring network, the second PIC is a downstream node of the first PIC within the optical network ring network, the second node is a downstream node of the second PIC within the optical network ring network, the second switch device is configured to perform data distribution in an uplink direction according to a running status of the FEs when IP data switching is performed, and the second switch device is further configured to send optical network data received by the first PIC to the second PIC when optical switching processing is performed.

* * * * *